United States Patent [19]
Machalitzky et al.

[11] Patent Number: 5,283,403
[45] Date of Patent: Feb. 1, 1994

[54] ELECTRIC SWITCH, IN PARTICULAR STEERING COLUMN SWITCH FOR MOTOR VEHICLES

[75] Inventors: Otto Machalitzky, Bietigheim-Bissingen; Xaver Vogel, Munningen, both of Fed. Rep. of Germany

[73] Assignee: SWF Auto-Electric GmbH, Fed. Rep. of Germany

[21] Appl. No.: 838,285

[22] PCT Filed: Jun. 22, 1991

[86] PCT No.: PCT/EP91/01155
§ 371 Date: Feb. 28, 1992
§ 102(e) Date: Feb. 28, 1992

[87] PCT Pub. No.: WO92/00205
PCT Pub. Date: Jan. 9, 1992

[30] Foreign Application Priority Data
Jun. 29, 1990 [DE] Fed. Rep. of Germany ....... 4020844

[51] Int. Cl.$^5$ .................. H01H 9/00; H01H 3/02; H01H 19/00
[52] U.S. Cl. .................. 200/61.54; 200/61.27
[58] Field of Search ............... 200/4, 5 R, 61.27, 61.3, 200/61.31, 61.34, 61.35, 61.54

[56] References Cited
U.S. PATENT DOCUMENTS
4,942,273 7/1990 Furuhash et al. ............... 200/61.54
5,047,600 9/1991 Enari et al. .................... 200/61.54

Primary Examiner—A. D. Pellinen
Assistant Examiner—Michael A. Friedhofer
Attorney, Agent, or Firm—Robert P. Seitter; J. Gordon Lewis

[57] ABSTRACT

Steering column switches for motor vehicles having a switch housing and an operating lever are known, which operating lever is swivellably mounted about an axis in the switch housing and which comprises a control grip rotatable about an axis of rotation extending in the longitudinal direction of the operating lever and which control grip is movable between at least two operating positions, and a switching rod at least substantially aligned in the longitudinal direction of the operating lever and substantially rotatable about the longitudinal axis via the control grip and via which switching rod at least one electric contact accommodated in the switch housing is movable. In most cases the motorcar manufacturers desire particular angles of rotation between the individual operating positions of the control grip. These angles of rotation are not always favorable for operating the electric contact. It is therefore provided according to the invention that in a twisting motion of the control grip about a particular angle of rotation out of operating position into an adjacent one the switching rod is rotatable about an angle of rotation which is different from the angle of rotation of the control grip.

60 Claims, 8 Drawing Sheets

ELECTRIC SWITCH, IN PARTICULAR STEERING COLUMN SWITCH FOR MOTOR VEHICLES

BACKGROUND OF THE INVENTION

Field of the Invention

This invention relates to an electric switch and, in particular, to an electric switch used as a steering column switch for motor vehicles.

State of the Art

In a switch of the present kind an operating lever is mounted to be swivelled about an axis in a switch housing. After the assembly in a motor vehicle, for example, the turn signal lamps of the motor vehicle are switched on and off by swivelling the operating lever about this axis. The operating lever includes a control grip which is rotatable about an axis of rotation extending in the longitudinal direction of the operating lever and which is movable into at least two operating positions. By turning the handle, for example, the sidelight and the main beam can be switched on, in which case the control grip has three stable operating positions, namely a neutral position, in which the sidelight and the main beam are switched off, a first operating position, in which the sidelight is switched on, and a second operating position in which in dependence on national regulations the sidelight and the main beam or only the main beam are switched on. In order to be able to control by means of the control grip at least one movable electric contact accommodated in the switch housing, a switching rod is provided which is at least approximately aligned in the longitudinal direction of the operating lever and is substantially rotatable about its longitudinal axis by means of the control grip.

In electric switches of the above described kind the car manufacturers normally prescribe how large the angle of rotation between the various operating positions of the control grip has to be. For example, an angle of rotation of 30° is prescribed. The angle of rotation of the control grip is thereby in the first instance selected according to ergonomic points of view, while the space conditions within the switch housing or the switching paths necessary for operating the electric contacts are not taken into consideration.

The invention is based on the problem of developing an electric switch in such a way that the construction within the switch housing can be made to far-reaching extent independent of the prescribed angle of rotation.

SUMMARY OF THE INVENTION

This problem is solved according to the invention in that in an electric switch, the switching rod, in a twisting motion of the control grip about a particular angle of rotation from one operating position into an adjacent operating position, rotates about an angle of rotation which is different from the angle of rotation of the control grip. Thus in an electric switch according to the invention the coupling between the control grip and the switching rod with the principle of turning the control grip and the switching rod about the same angle has been abandoned. The angle of rotation of the switching rod may rather be selected independently of the angle of rotation of the control grip and can be adapted to spacial and electrical conditions within the switch housing.

If there in only little space available in the switch housing, the angle of rotation of the switching rod is preferably smaller than the angle of rotation of the control grip.

If the electric contact is only movable by the switching rod between two adjacent operating positions during part of the twisting motion of the control grip, it has a greater velocity than in a case in which the control grip is movable between two adjacent operating positions during the entire twisting motion. This higher velocity can be advantageous for the electric contact making. In the other case a more uniform switching behavior seems possible to be felt.

As has been mentioned, the control grip has three stable switching positions if it is used for switching on the sidelight and the main beam of a motor vehicle. An uneven number of operating positions of the control grip can also be necessary for other applications. In case of such an uneven number of operating positions of the control grip, a construction is preferred in which the movement of the switching rod in a twisting motion out of the central operating position is in one direction symmetrical to a movement in a twisting motion of the control grip out of the central operating position into the other direction. Thus, the switching conditions within the turning capacity of the control grip do not differ very much.

The movement of the switching rod and its influence on the movable electric contact can be easily looked over if the movement of the switching rod during the twisting motion of the control grip between two operating positions is a pure rotation about an axis of rotation extending in the longitudinal direction of the operating lever. The axis of rotation of the pure rotation of the switching rod then preferably coincides with the axis of rotation of the control grip.

A design with fewer parts is possible if the movement of the switching rod during the twisting motion of the control grip between two operating positions is composed of a rotation about a longitudinal axis and of a lateral deflection of the first end of the switching rod facing the control grip preferably about the second end of the switching rod. The second end of the switching rod is suitably mounted to be swivellable to all sides. The combined movement of the first end of the switching rod facing the control grip permits a direct coupling between the control grip and the switching rod.

In another construction, the control grip is coupled with the switching rod via at least one spring element. A construction can be conceived in which two spring elements rest against the switching rod by means of one end, each of which one spring element with its other end rests against the control grip and tends to turn the switching rod in one direction and the other spring element rests against a non-rotatable part of the switch lever and tends to turn the switching rod in the other direction of rotation. In this case a symmetry can be provided with regard to a central switching position in such a way that in the central operating position of the control grip the two spring elements with their respective other ends rest against the control grip and also against a non-rotatable part of the switch lever. In an embodiment of this kind the switching rod is moved together with the control grip during the entire rotation.

In order to ensure the twisting motion to be carried out also in case of tightness of the switching rod it appears to be more favorable if in a first switching position the at least one spring element is relaxedly arranged between the control grip and the switching rod and in a twisting motion of the control grip into a second operating position adjacent to the first operating position the switching rod is at first rotatable by the at least one spring element as far as to a stop and thereafter the spring element may be tensioned more heavily. With normal smoothness of the switching rod, at first the switching rod is twisted and then the spring element is tensioned more heavily. If, in contrast thereto, the switching rod is so tight that the force of the spring element is not sufficient to rotate the switching rod, the spring element is at first tensioned to a greater extent until finally the spring force is big enough to twist the switching rod or directly to take along the switching rod.

If no additional measures are taken a spring element between the control grip and the switching rod provides that the switching forces in opposite directions become different. Insofar as several stable switching positions of the control grip are needed, the restoring force of the spring element has to be compensated for by an increased locking force between a part of the electric switch movable by a twisting motion of the control grip and a part at rest during the twisting motion of the electric switch. Therefore a higher wear has to be expected insofar as no high-quality and thus expensive materials are to be used.

This is why in another embodiment of an electric switch according to the invention the control grip and the switching rod are coupled by an eccentric piece mounted on the operating lever independently of the control grip and of the switching rod with an axis of rotation spaced from the axis of rotation of the operating lever. In one operating position of the control grip, in particular, in a central operating position, the two points of action are on the one hand preferably positioned between the control grip and the eccentric piece and on the other hand between the eccentric piece and the switching rod in a plane defined by the axes of rotation of the control grip and of the eccentric piece. In the described operating position the axis of rotation of the switching rod is also preferably located in the described plane or coincides with the axis of rotation of the control grip. In this way the courses of motion for a twisting motion of the control grip from the described operating position into opposite directions are symmetrical.

A third embodiment of an electric switch according to the invention is also provided. In this embodiment it has been taken care that, starting from a particular operating position of the control grip and of the switching rod, during the twisting motion the switching rod is at first turned about a longitudinal axis because in a particular sector of dial a pivot bearing is provided for the switching rod. Outside of the second of dial corresponding to the desired angle of rotation of the switching rod the switching rod is free from the pivot bearing and is swivelled laterally during a further twisting motion of the control grip.

In order to reliably prevent the switching rod from being hooked in when turned backwards another embodiment also having a direct coupling between the control grip and the switching rod is especially preferred. In this embodiment at least the first end of the switching rod facing the control grip is rotatably swivellable about an axis of rotation which is spaced from the axis of rotation of the control grip and is rotatable about the axis of rotation of the first end.

In order to transform a rotation of the control grip into a movement of the movable electric contact, several component parts are used the dimensions of which are subject to tolerances and the couplings of which can have play, so that a switching piece movably mounted in the switch housing, which switching piece is displaceable by the switching rod and which may move the electric contact, is locked with the switch housing in at least one operating position by means of a locking curve follower insure that at least one operating position of the switching piece and thus of the electric contact is exactly defined.

For actuating the electric contact, the switching rod, on its end not facing the control grip, preferably has a lateral finger. Thereby the direction in which the electric contact will be actuated will in general not be located in a plane standing perpendicularly on the longitudinal axis of the switching rod. This is so in particular as far as steering column switches are concerned in which the longitudinal direction of the operating lever and the longitudinal direction of the steering column generally comprise an angle not equal to 90 degrees, however the electric contact is, for example, movable in parallel to the steering column. In order to hold the finger at least substantially in the operating plane, when the switching rod is turned, it is provided according in one embodiment that the finger is in a particular place guided in a direction including an angle not equal 90 degrees with the longitudinal direction of the operating lever. In yet another embodiment, the switching rod is displaceable in its longitudinal direction. It is to be emphasized that the latter described embodiment can also be advantageously used if, when the control grip is twisted from one operating position in to an adjacent operating position, the control grip and the switching rod are turned at the same angle.

BRIEF DESCRIPTION OF THE DRAWING

Several embodiments of an electric switch according to the invention are shown in the accompanying drawings. The invention will now be described by way of Figures of the accompanying drawing, in which.

DESCRIPTION OF THE PREFERRED EMBODIMENTS

Figure 1:
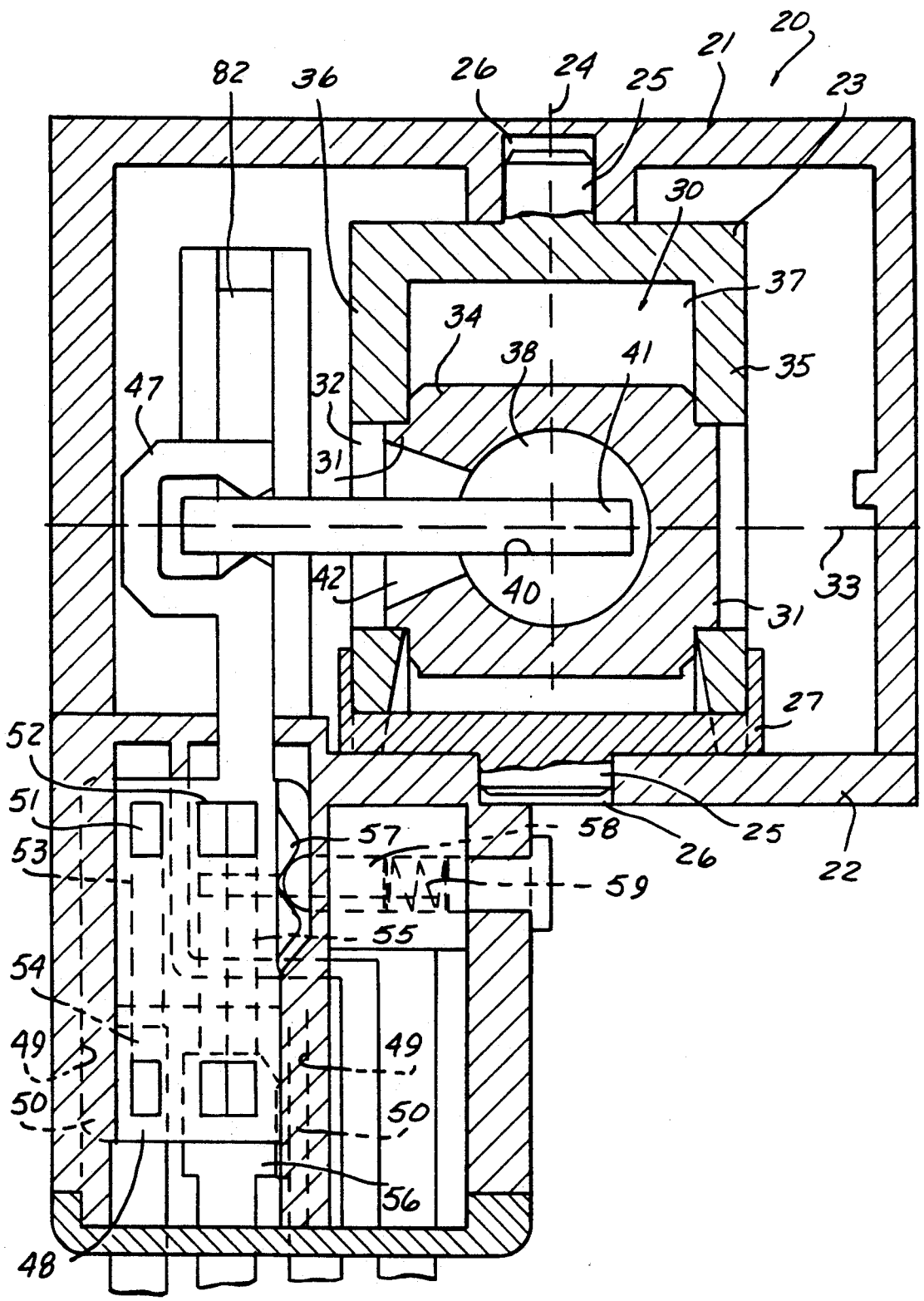
FIG. 1 is a view into an open electric switch including a slide which is linearly movable by turning parts of an operating lever.

In the electric switch according to FIG. 1 in the housing 20 formed of a top 21 and a bottom 22, a carrier 23 is mounted in such a way that it can be swivelled about a swivelling axis 24 which may be designated vertical. For this purpose the carrier 23 has two bearing pins 25, the center lines of which are flush with each other and dip into bores 26 of the top 21 or of the bottom 22, respectively. A bridging contact is hung in on the carrier 23 in a manner not shown in detail, however generally known, through which the turn-signal lamps of a motor vehicle can be switched on when the electric switch is connected with the motor vehicle network as provided.

An operating lever 30 is in such a way mounted on the carrier 23 by means of two bearing pins 31 and two bearing bores 32 in the carrier 23, into which the bearing pins 31 dip, that as a whole it is swivellable relative to the carrier 23 about a swivelling axis 33 perpendicularly extending through the swivelling axis 24 which may be designated horizontal. The bearing pins 31 are positioned on a basis 34 of the operating lever and, when mounted, are pushed into the bearing bores 32 in the direction of the swivelling axis 24 by widening the side walls 35 add 36 of the frame-shaped carrier 23. Thereafter the recess 37 for the operating lever 30 in the carrier 23 is covered by a lid 27 on which is also positioned one bearing pin 25 of the carrier 23. When the electric switch is connected with the motor vehicle electric network it can be changed over in a known manner, not shown in detail, between the high beam and the low beam of a motor vehicle by swivelling the operating lever 30 about the horizontal swivelling axis 33.

The basis 34 of the operating lever 30 is formed as a hollow body through which a switching rod 38 extends having the shape of a pipe closed at its end positioned in the housing 20. The accumulation of material at the closed end 39 of the switching rod 38 is approximately effected in the plane defined by the two swivelling axes 24 and 33. The end 39 has a transverse bore 40 the axis of which is positioned in the plane defined by the two swivelling axes 24 and 33 and into which an actuating finger 41 is pressed. The finger 41 extends through an elongated slot 42 in a bearing pin 31 of the basis 34 of the operating lever 30 and through a bore 32 of the carrier 23 in a sideward direction an engages therein a U-shaped guidance 47 of a switch slide 48. The slide switch 48 is guided in the bottom 22 of the housing 20 by means of two grooves 49 extending in parallel to the swivelling axis 24 and by means of two strips 50 engaging in the grooves 49 in such a way that it can be moved in parallel to the swivelling axis 24 Two bridging contacts 51 and 52 are hung in on it, of which the bridging contact 51 cooperates with two stationary contacts 53 and 54 and the bridging contact 52 co-operates with two stationary contacts 55 and 56.

The switch slide 48 can occupy three different operating positions of which FIG. 1 shows a central operating position. One can see that in this operating position of the switch slide 48 the axis of the actuating finger 41 coincides with the horizontal swivelling axis 33.

In order to provide that the operating positions of the switch slide 48 can be exactly adhered to on one of the strips 50 of the switch slide 48, a locking curve 57 is guided, in which a locking pin 58 guided in the housing bottom 22 engages under the pressure of a helical spring 59. If the electric switch according to FIG. 1 is connected in the right manner to the motor vehicle network, the sidelight can be switched on via the bridging contact 51 and the main beam of the motor vehicle via the bridging contact 52, whereby, starting from a neutral operating position in an adjacent operating position at first the sidelight and in a further operating position in addition to the sidelight the main beam is switched on.

The space conditions in the housing 20 only admit particular switching paths of the switch slide 48, which switching paths correspond to particular angles of rotation of the operating finger 41 or of the switching rod 38, respectively. These angles of rotation of the switching rod 38 are smaller than the desired angle of rotation for a control grip 60 of the operating lever 30 between two switching conditions. Therefore a mechanism is built in in the operating lever 30 through which the angles of rotation of the control grip 60 are reduced to smaller angles of rotation of the switch rod 38.

Figure 2:
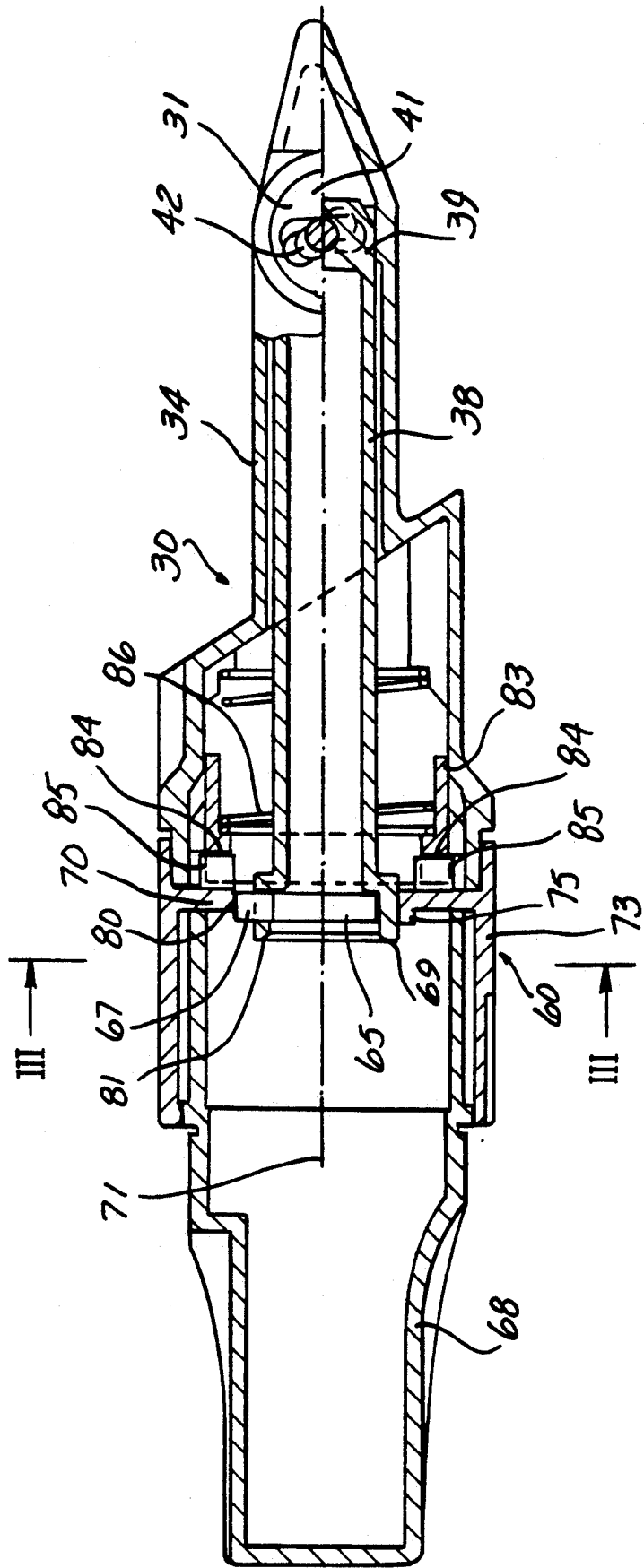
FIG. 2 is a longitudinal cross sectional view through a first embodiment of an operating lever for use on an electric switch according to FIG. 1.
Figure 3:
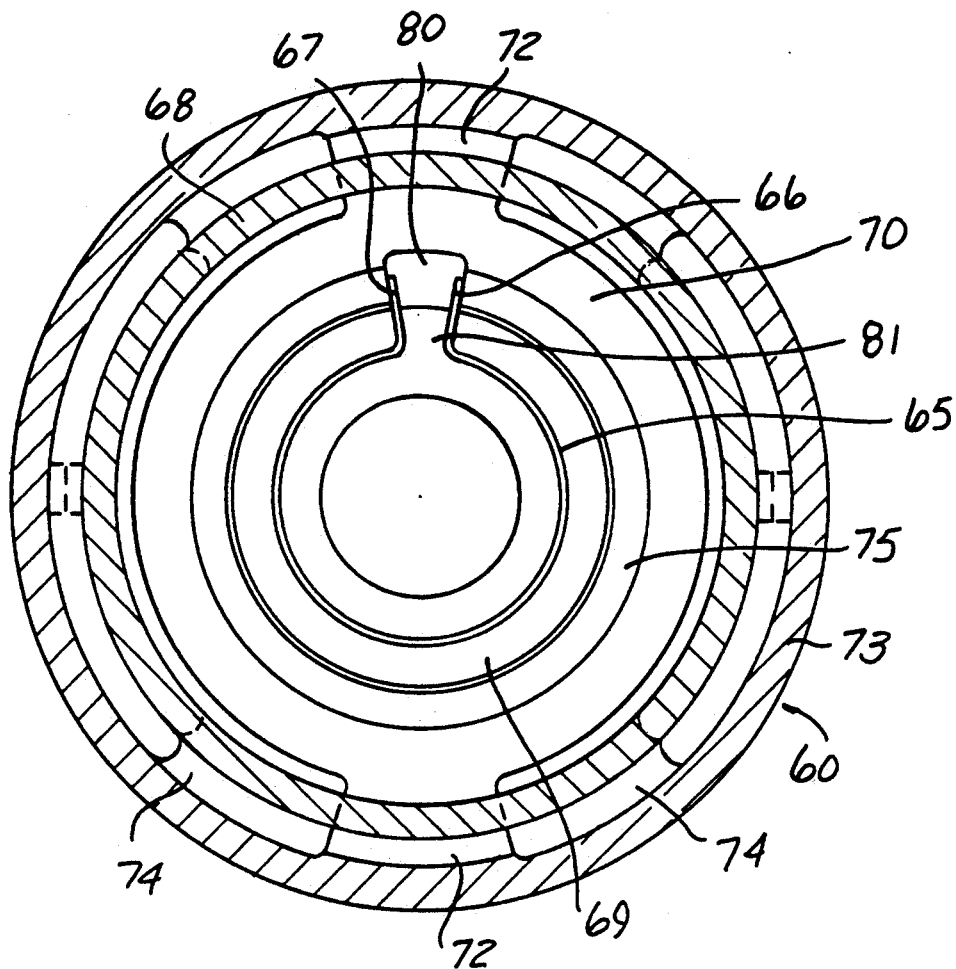
FIG. 3 is a cross sectional view taken along the line III—III of FIG. 2.

In the embodiment according to FIGS. 2 and 3 this is effected by means of a ring-shaped leafspring 65 the ends 66 and 67 of which are radially bent towards the outside. The control grip 60 is rotatably mounted outside on the basis 34 and on a swivelling handle 68 fixed on the basis 34 of the operating lever 30. The switching rod 38 is at its closed end 39 mounted in the basis 34 and at its other end 69 it is rotatably mounted about a longitudinal axis on an inner flange 70 of the control grip 60. This longitudinal axis is flush with the axis of rotation 71 of the control grip 60. As can clearly be seen from FIG. 3, the inner flange 70 is only connected with the outer ring 73 of the control grip 60 by means of two portions 72 which are small in the circumferential direction and opposite to each other so that two recesses 74 shaped like a ring segment come into existence. The swivelling handle 68 is connected with the basis 34 of the operating lever 30 through these two recesses 74.

The inner flange 70 of the control grip 60 has a collar 75 on the inside so that a certain bearing length for the switching rod 38 has come into existence. In the end 69 of the switching rod 38 there is a radial gap 80 or 81 just as in the collar 75 of the control grip 60, which end 69 is enlarged in comparison with the remaining diameter of the switching rod 38. The gaps 80 and 81 extend over the same angle. The leafspring 65 is positioned inside the end 69 of the switching rod 38 and by means of its two ends 66 and 67 it engages in the gaps 80 and 81.

In correspondence to the switch slide 48, the control grip 60 can also occupy three operating positions. In the central operating position shown in FIG. 3 the ends 66 and 67 of the leafspring 65 rest against the collar 75 of the control grip 60 and also against the switching rod 38. If now, starting from the central operating position according to FIG. 3, the control grip 60 is rotated in the clockwise direction it takes along at first the switching rod 38 by means of the ends 67 and 66 of the leafspring 65 until the switching slide 48 hits the housing top 21 in a portion 82. Now the switching rod 38 cannot be turned any further. When the control grip 60 is continued to be turned, only the end 67 of the leafspring 65 can be taken along until it hits the end 67. The leafspring 65 is now under higher prestress and tends to reset the control grip 60 once more. This is prevented by a locking device consisting of a locking ring 83 with two identical locking curves 84 which ring is held in a manner protected against twisting, but axially movable on the basis 34, two locking cams 85 on the control grip 60 engaging in the locking curves 84 and a helical compression spring 86, which is supported on the basis 34 and on the locking ring 83 and presses the locking ring 83 against the locking cams 85.

When the control grip is returned into the central operating position at first only the leafspring 65 relaxes without taking along the switching rod 38. Only if the end 67 of the leafspring 65 hits the switching rod 38 it is also turned. Starting from the central operating position according to FIG. 3 the course of motion is effected analogously, when the control grip 60 is twisted in a counterclockwise direction.

If one starts from a lateral operating position and moves the control grip 60 via the central operating position into the other lateral operating position the spring is at first relaxed. Then the switching rod is taken along beyond the central switching position and at last the leafspring 65 is tensioned again. Thus it is characterizing for the embodiment according to FIGS. 2 and 3 that the switching rod 38 is only taken along by the control grip 60 in a particular sector of dial of the angle of rotation of the control grip 60.

Figure 4:
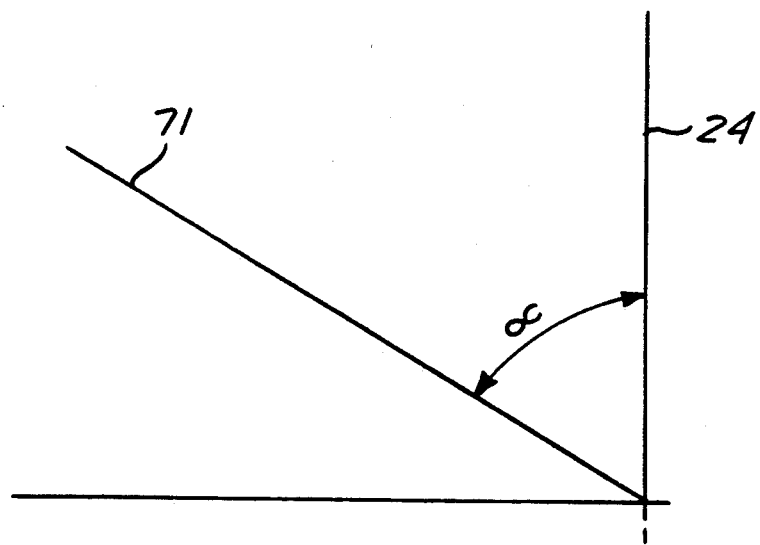
FIG. 4 is a schematic sketch for illustrating the angle between the longitudinal axis of the operating lever and a swivelling axis of the operating lever.

From FIG. 2 it can also be seen that the longitudinal direction of the slot 42 in a bearing pin 31 of the basis 34 of the operating lever 30 includes an angle not equal to b 90 degrees with the longitudinal direction of the switching rod 38 and the entire operating lever 30, namely an angle of 60 degrees. This angle corresponds to the angle according to FIG. 4 which is included by the vertical swivelling axis 24 and the longitudinal direction of the operating lever 30, which matches the direction of the axis of rotation 71 of the control grip 60, when the operating lever 30 occupies its rest position relative to the horizontal swivelling axis 33. The exact guidance of the actuating finger 41 in the slot 42 takes place directly on the surface of the switching rod 38, whereas the slot 42 widens towards the outside in such a way that the slanting position of the operating finger relative to the plane defined by the two swivelling axes 24 and 33 in the two lateral operating positions is made possible. Directly on the top of the switching rod 38 in contrast thereto the operating finger 41 remains in the said plane. In order to make this possible the switching rod 38 is displaceable in the longitudinal direction. The collar 75 ensures an engagement of the leafspring 65 in the gap 80 in each position of the switching rod 38.

Figure 5:
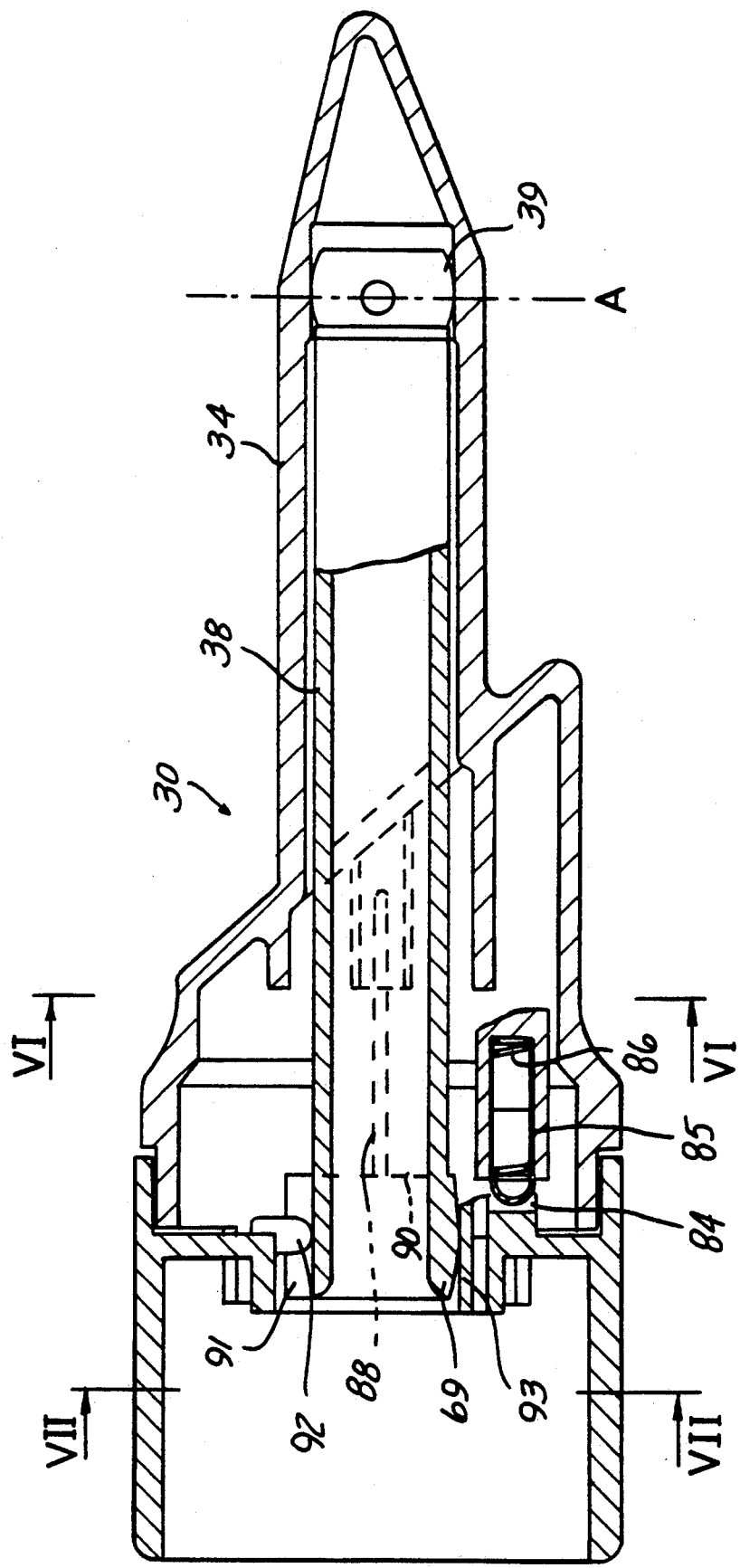
FIG. 5 is a second embodiment of an operating lever shown in a long tudinal cross section.
Figure 6:
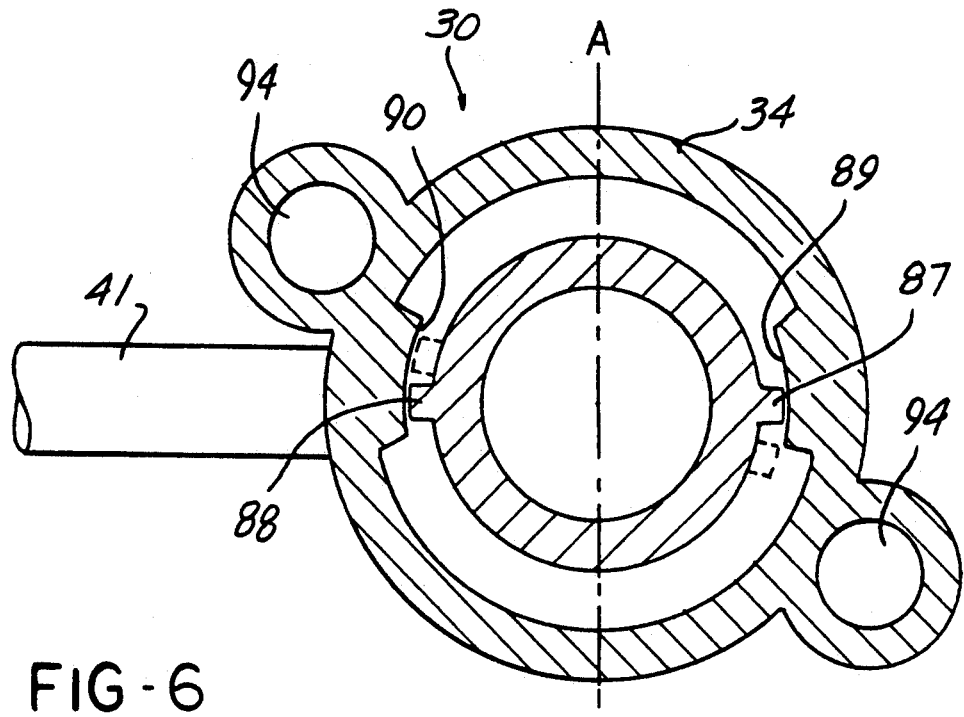
FIG. 6 is a cross sectional view taken along the line VI—VI of FIG. 5.
Figure 7:
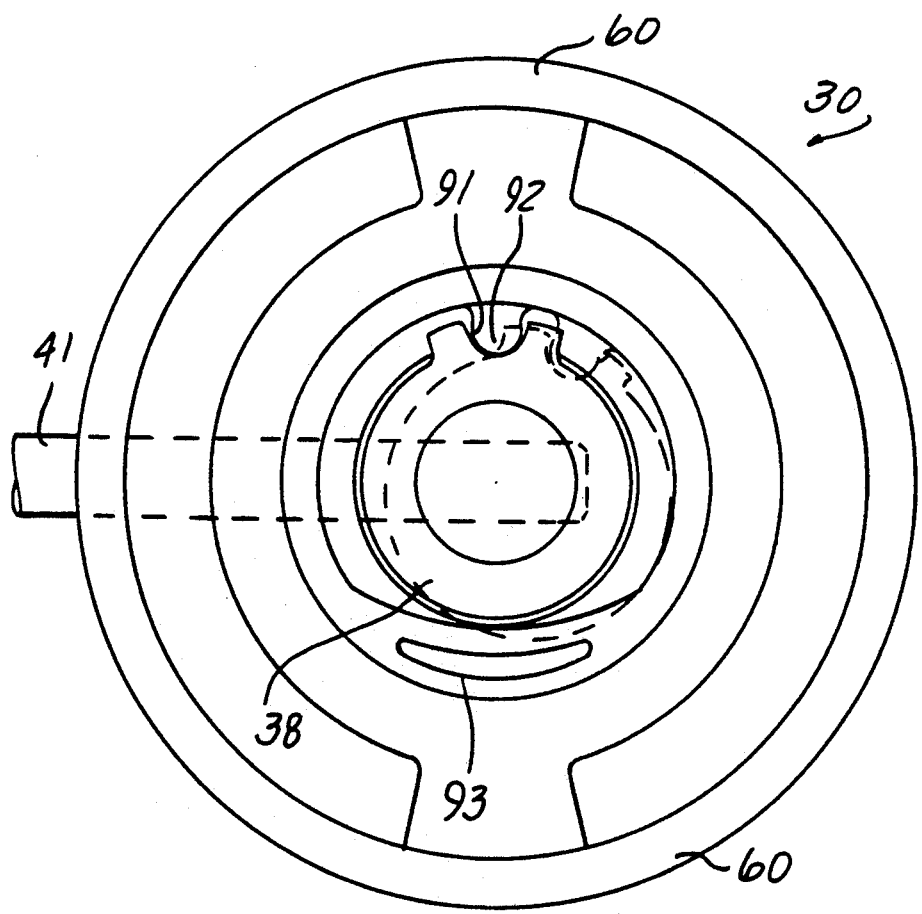
FIG. 7 is a cross sectional view taken along the line VII—VII of FIG. 5.

The operating lever 30 according to FIGS. 5 to 7 also has a basis 34, a control grip 60 and a switching rod 38. As in the embodiment according to FIGS. 2 and 3 the actuating finger 41 is inserted in the closed end 39 of the switching rod 38. The end 39 is ball-shaped outside so that the switching rod 38 is mounted on the basis 34 in a way that it can be moved to all sides. At a spacing from the end 39 two ribs 87 and 88 are formed onto the outside of the switching rod 38, which ribs 87 and 88 are positioned diametrically opposite to each other and the outside of which is cylindrically curved with the longitudinal axis of the switching rod 38 used as the cylinder axis. The basis 34 has two bearing surfaces 89 and 90. The arrangement of the bearing surfaces 89 and 90 relative to the ribs 87 and 88 is selected in such a way that in the central operating position of the control grip 60 the ribs 87 and 88 are positioned closer to the lateral edge of the bearing surfaces extending in the direction of the axis of rotation of the control grip 60 than to the other lateral edge and that the bearing surfaces extend from the ribs 87 and 88 into opposite circumferential directions.

The end 69 of the switching rod 38 has an outside deepening 91 in which the control grip 60 engages by means of a projection 92. Opposite to the projection 92 a resilient portion 93 is formed in one piece with the control grip 60, which resilient portion 93 presses against the switching rod 38 and holds the cam 92 in the deepening 91. Deepening 91 and the projection 92 are formed in such a way that the switching rod 38 can be swivelled about the projection 92.

Now it will be started from the central operating position of the control grip 60 and of the switching rod 38 shown in the Figures of the drawing. If, according to FIGS. 6 and 7, the control grip 60 is turned in clockwise direction, the switching rod 38 is at first rotatable about its longitudinal axis via the ribs 87 and 88 and the bearing surfaces 89 and 90 so far until the rib 87 has moved out of the area of the bearing surface 89. The switch slide 48 has then reached an end position and the switching rod 38 cannot be twisted further. However the control grip 60 can be turned further into one of its three stable operating position, wherein the switching rod 38 can be swivelled sidewards about its end 39. This is possible because the rib 89 is positioned outside the bearing surface 89. The position reached by the switching rod is shown in FIG. 7 by broken lines. Just as in the embodiment according to FIGS. 2 and 3 the three operating positions are defined by a locking device. Now the locking curve 84 is positioned on the control grip 60, whereas a locking cam 85 and a helical spring 86 loading the locking cam 85 is guided in a pocket bore 94 of the basis 34 of the operating lever 30. Because of clarity's sake only one locking curve, one locking cam and one helical compression spring are shown in FIG. 5. However it can be seen from FIG. 6, in which two pocket bores 94 can be recognized, that two uniformly operating locking devices are available so that the control grip 60 cannot be canted.

In the embodiment according to FIGS. 5 to 7, similarly to the embodiment according to FIGS. 2 and 3, the switch slide 48 is always only taken along in a particular angular range of rotation of the control grip 60, whereas it is at rest in another angular range of rotation and the twisting motion of the control grip 60 is compensated for differently.

This is not so in the third embodiment according to FIGS. 8 and 9 described below. In this embodiment the switching rod 38 is indeed during the entire rotation of the control grip 60 turned in such a way that the switch slide is also moved during the entire rotation of the control grip. Only the angle of rotation of the control grip 60 is geared down to a smaller angle of rotation of the switching rod 38.

The switching rod 38 is rotatably mounted with its end 39 in the basis 34 of the operating lever 30 and with its other end 69 in a central cylindric opening in the inner flange 70 of the control grip 60. The axis of rotation of the switching rod 38 matches with the axis of rotation 71 of the control grip 60. In contrast to the embodiment according to FIGS. 2 and 3 the swivelling handle 68 is now equipped with a bottom 96 within the control grip 60, which bottom is engaged in the swivelling handle 68. Between the inner flange 70 of the control grip 60 and the bottom 96 of the swivelling handle 68 an eccentric piece 100 is arranged which is rotatably mounted in a bearing bore 102 of the bottom 96 by means of a pin 101. The axis of rotation 103 is thereby spaced from the axis of rotation 71 of the control grip 60. The control grip 60 engages in an opening 105 of the eccentric piece 100 by means of a pin 104 formed onto its inner flange 70, whereby the opening 105 in the radial direction towards the axis of rotation 103 of the eccentric piece 100 is longer than the pin, and whereas in the circumferential direction it corresponds to the diameter of the pin. The spacing of the center line 106 of the pin 104 from the axis of rotation 71 of the control grip 60 is substantially larger than the spacing of the axis of rotation 103 of the eccentric piece 100 from the axis of rotation 71. In addition the center line 106 in the central operating position of the control grip 60 lies in the plane defined by the two axes 71 and 103 and with regard to the axis of rotation 71 of the control grip 60 opposite to the axis of rotation 103. Another pin 107 is formed onto the eccentric piece 100 in addition to the pin 101, which pin 107 points into the opposite direction and projects into an opening 108 in an outer flange 109 on the end 69 of the switching rod 38. The opening 108 is oblong just like the opening 105. The pins 104 and 107 are positioned opposite to each other with regard to the axis of rotation of the pin 101, so that in the central position of the control grip 60 the center line 110 of the pin 107 is also located in the plane defined by the axes of rotation 71 and 103. The spacing of the pin 107 from the axis of rotation 71 of the control grip 60 and the switching rod 38 is larger than the spacing of the pin 103 from the axis of rotation 71.

It is assumed that the control grip 60 is positioned in the central operating position. The pins 101, 104 and 107 occupy the positions shown in FIG. 9. If, according to FIG. 9, the control grip 60 is turned in a clockwise direction the eccentric piece 100 is taken along via the pin 104 and turned about the axis of rotation 103 in clockwise direction. The angle of rotation of the eccentric piece 100 about the axis of rotation 103 is thereby smaller than the angle of rotation of the control grip 60 about the axis 71 because the spacing between axis 103 and pin 104 is larger than the spacing of the pin 104 from the axis of rotation 71. The eccentric piece 100 takes along the switching rod 38 via the pin 107 so that the switching rod is turned about the axis 71 in a clockwise direction. Because the spacing between the pin 107 and the axis of rotation 103 is smaller than the spacing of the pin 107 from the axis of rotation 71, the angle of rotation of the switching rod 38 about the axis of rotation 71 is smaller than the angle of rotation of the eccentric piece 100 about the axis of rotation 103. Thus the angle of rotation of the control grip 60 is altogether geared down to a smaller angle of rotation than that of the switching rod 38.

Figure 9:
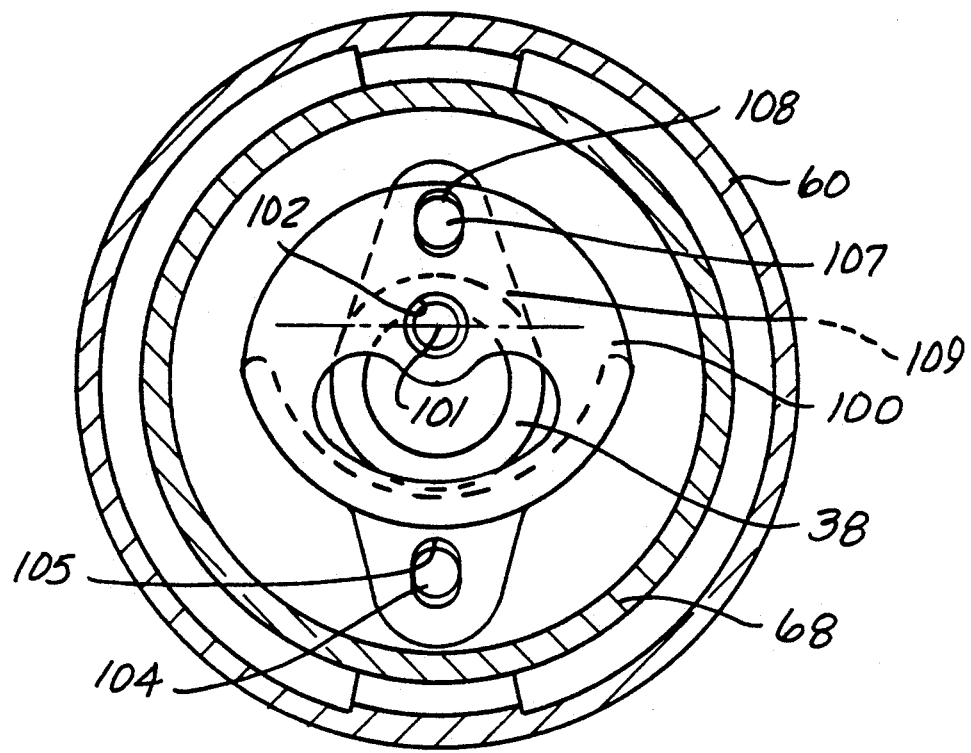
FIG. 9 is a cross sectional view taken along the line IX—IX of FIG. 8.

If the control grip 60 is twisted in a counterclockwise direction starting from the positions according to FIG. 9 the movements are carried out laterally reversed. This results in a symmetry of motion relative to the central operating position of the control grip 60.

Figure 8:
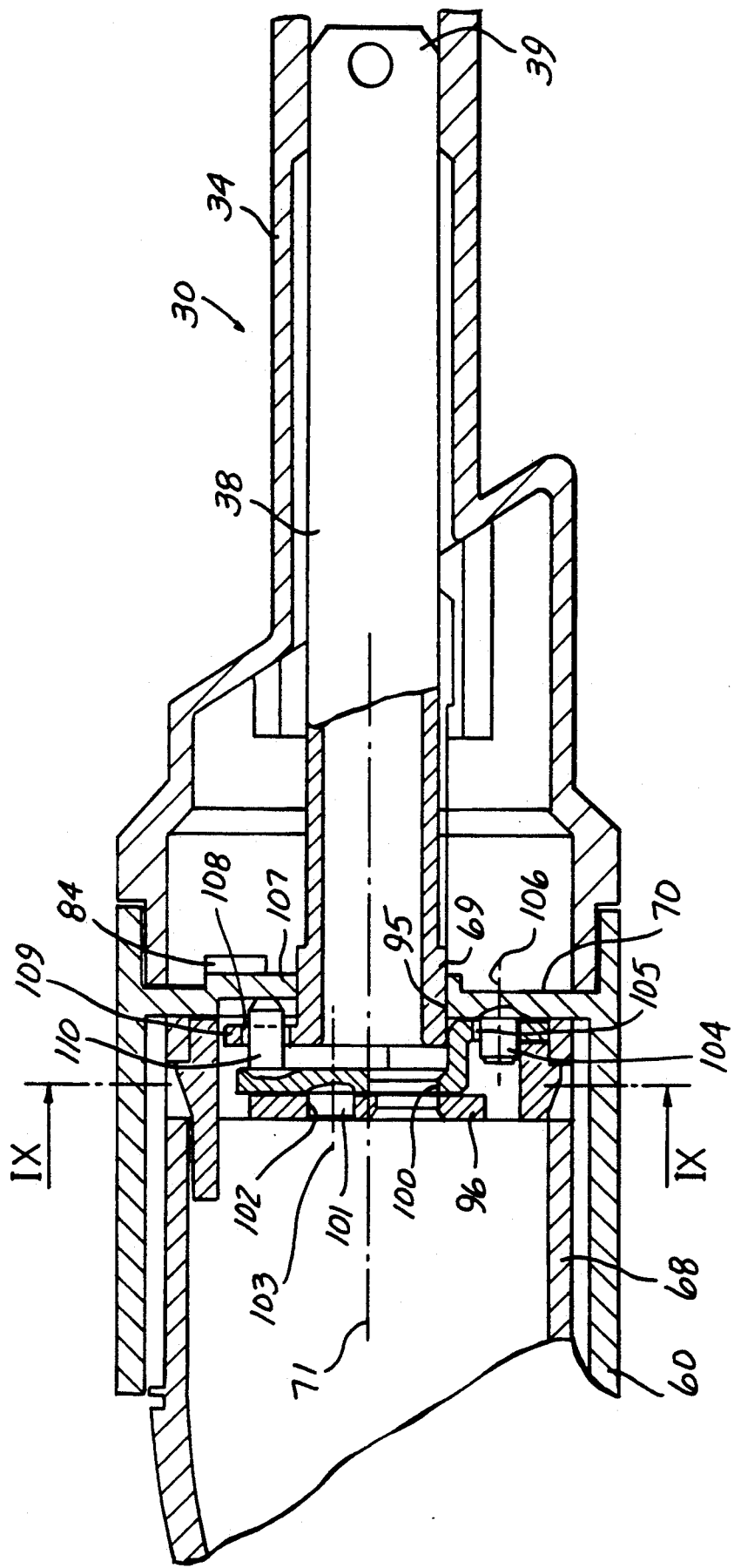
FIG. 8 is a third embodiment of an operating lever shown in a longitudinal cross section.

In an embodiment according to FIGS. 8 and 9, in addition to a locking device between the switch slide 48 and the housing 20, advantageously a locking device is also provided between the control grip 60 and the basis 34 of the operating lever 30. FIG. 8 shows a locking curve 84 on the control grip 60. The other parts of the locking device have been omitted because they can be designed in accordance with the embodiment of FIGS. 5 to 7.

In the embodiment according to FIGS. 8 to 9 the switching rod 38 is also turned about the same axis as the control grip 60 during the entire movement of the control grip 60, whereby during the entire rotation of the control grip 60 the switch slide 48 is moved. In the embodiment according to FIGS. 10 and 11 the switch slide 48 also moves during the entire rotation of the control grip 60. The movement of the switching rod 38 in contrast thereto is composed of a rotation about the longitudinal axis of the switching rod 38 and of a lateral swivelling motion of the end 69. Therefore the end 39 of the switching rod 38 is ball-shaped outwardly.

The end 69 has an outside flange 109 with an opening 108 in which now the control grip 60 with the pin 106 engages directly. A second outer flange on the end 60 of the switching rod 38 has a bearing bore 116 into which engages a bearing pin 117 formed onto the bottom 96 of the swivelling handle 68.

In the central position of the control grip 60 the two pins 106 and 117 are located diametrically to each other with regard to the axis of rotation 71 of the control grip 60 in the central operating position of the control grip 60 coinciding with the center line of the switching rod 38. Thus they have the same spacing from the axis of rotation 71.

Figure 11:
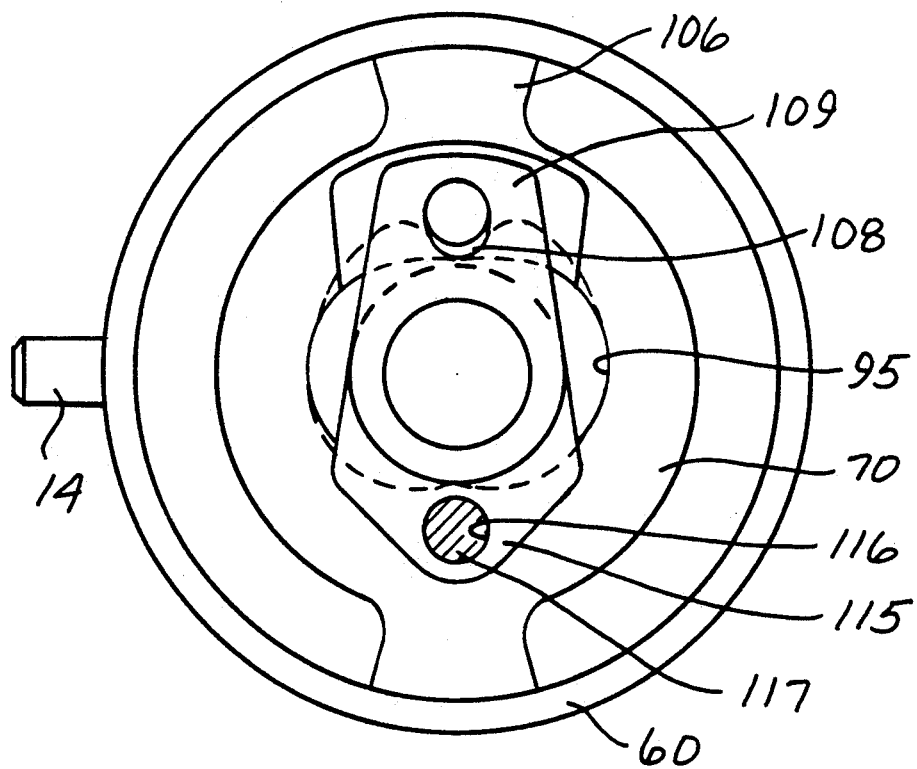
FIG. 11 is a cross sectional view taken along the line XI—XI of FIG. 10, wherein for clarity's sake two parts have been omitted.

It is assumed that the control grip 60 and the switching rod 38 occupy the central operating position according to FIG. 11. If now the control grip 60 according to FIG. 11 is turned in a clockwise direction the pin 106 takes along the switching rod 38 and swivels the end 69 of the switching rod about the center line 118 of the pin 117. The longitudinal axis of the switching rod 38 is thereby tilted relative to the axis of rotation 71 and intersects the axis of rotation in the center of the ball-shaped outer surface of the first end 39 of the switching rod 38. The movement of the switching rod 38 can thus be conceived as composed of a rotation about the longitudinal axis of the switching rod 38 and of a swivelling motion about an axis extending perpendicularly to the longitudinal axis through the center of the ball-shaped outer surface of the end 39. The rotation causes a swivel of the actuating finger 41 in the sense of a displacement of the switch slide 48.

In correspondence with the movement of the end 69 of the switch rod 38 the central opening 95 in the inner flange 70 of the control grip 60 is designed in such a way that it does not impede a movement of the end 69. The shape can be seen from FIG. 11.

Figure 10:
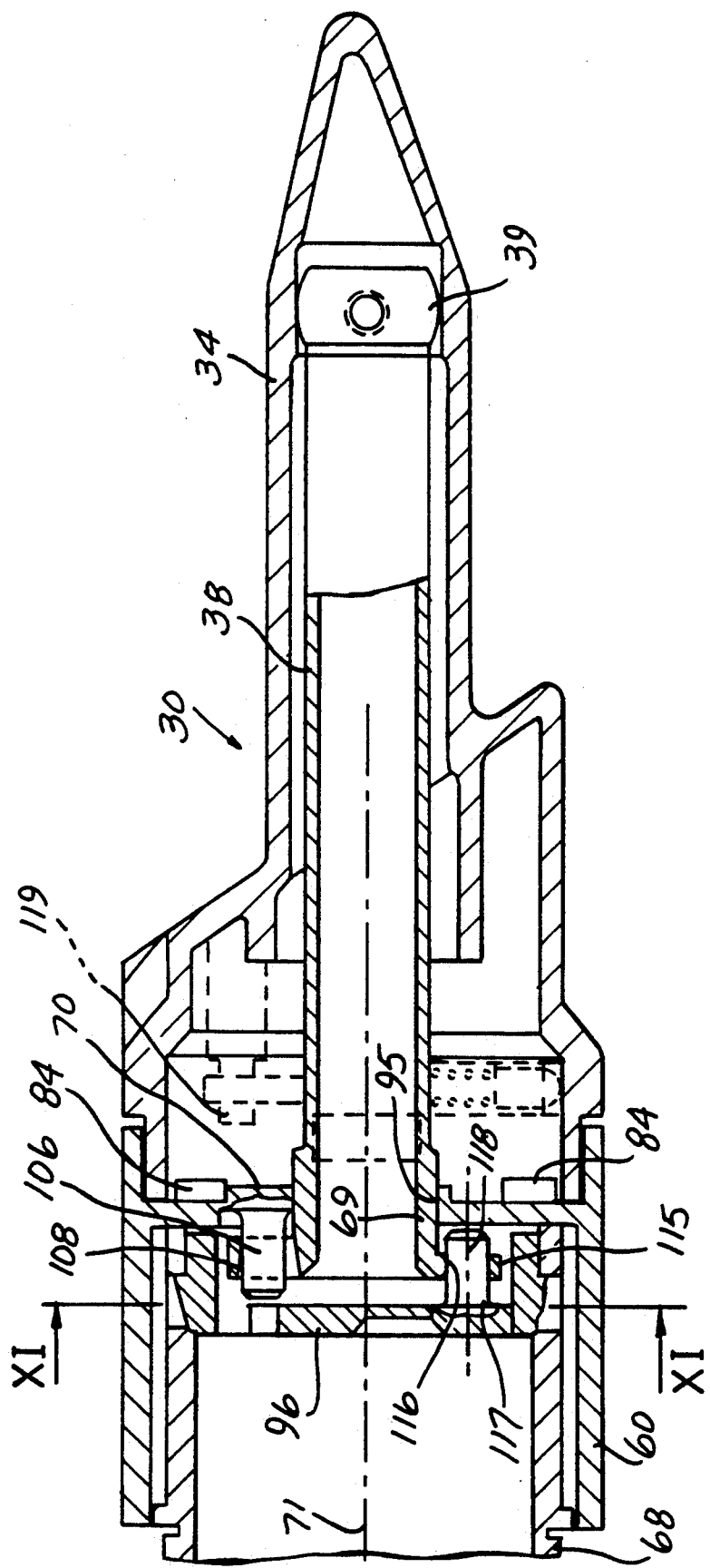
FIG. 10 is a longitudinal cross sectional view through a fourth embodiment of an operating lever.

In FIG. 10 there is also indicated a locking curve 84 on the control grip 60 in order to demonstrate that between the control grip 60 and the basis 34 of the operating lever 30 a locking device is effective.

A bearing pin for the switching rod 38 instead of being formed onto the bottom 96 of the swivelling handle 68 could also be formed onto the basis 34. This has been indicated by broken lines in FIG. 10. The pin is provided with the reference numeral 119. The switching rod 38 could be engaged with the basis 34 instead of the control grip 60, whereby a radial guidance relative to the pin 119 for a locking pin and a pressure spring could be formed onto the switching rod 38 and the basis 34 could comprise a locking curve.

It is also to be pointed out that in an embodiment according to FIGS. 10 and 11 the opening 116 could also be oblong like the opening 108 and the opening 108 could be circular like the opening 116.

Of course in the embodiments according to FIGS. 5 to 7, FIGS. 8 and 9 and FIGS. 10 and 11 it has also been provided that the switching rod 38 can be moved in the longitudinal direction and thus permit a guidance of the actuating finger 41 in accordance with the embodiment according to FIGS. 2 and 3.

What is claimed is:

1. An electric switch, especially a steering column switch for motor vehicles, comprising a switch housing and, an operating lever which is mounted to be swivelled about an axis in the switch housing and which includes a control grip rotatable about an axis of rotation extending in the longitudinal direction of the operating lever and which is movable between at least two operating positions for switching on and off the sidelight and the main beam of a motor vehicle, and a switching rod which is aligned at least substantially in the longitudinal direction of the operating lever and rotatable via the control grip substantially about its longitudinal axis and by which at least one electric contact accommodated within the switch housing is movable, wherein a twisting motion of the control grip about a particular angle of rotation, the switching rod may be turned from one operating position to an adjacent operating position about an angle of rotation differing from the angle of rotation of the control grip.

2. The electric switch according to claim 1, wherein the angle of rotation of the switching rod is smaller than the angle of rotation of the control grip.

3. The electric switch according to claim 1, wherein the at least one electric contact is only movable by the switching rod during part of the twisting motion of the control grip between two adjacent operating positions.

4. The electric switch according to claim 3, wherein the movement of the switching rod during a twisting motion of the control grip out of a central operating position in one direction is symmetrical to a movement in a twisting motion of the control grip out of the central operating position into the other direction.

5. The electric switch according to claim 4, wherein the central operating position of the control grip a center line of the switching rod is flush with the axis of rotation of the control grip.

6. The electric switch according to claim 1, wherein the at least one electric contact is movable via the switching rod via the entire twisting motion of the control grip between two adjacent operating positions.

7. The electric switch according to claim 1, wherein the movement of the switching rod during the twisting motion of the control grip between two operating positions is a pure rotation about an axis of rotation extending in the longitudinal direction of the operating lever.

8. The electric switch according to claim 7, wherein the axis of rotation of the pure rotation of the switching rod coincides with the axis of rotation of the control grip.

9. The electric switch according to claim 1, wherein, during a twisting motion of the control grip between two operating positions, the movement of the switching rod is composed of a rotation about a longitudinal axis and of a lateral deflection of the end of the switching rod facing the control grip about the second end of the switching rod.

10. The electric switch according to claim 9, wherein the second end of the switching rod is mounted in the operating lever to be swivellable to all sides.

11. The electric switch according to claim 10, wherein the second end of the switch rod is provided with a ball-shaped outer surface.

12. The electric switch according to claim 1, wherein the control grip and the switching rod are directly coupled with each other.

13. The electric switch according to claim 12, wherein the switching rod and the operating lever have bearing surfaces for a rotation of the switching rod about a longitudinal axis, in which the bearing surfaces are only opposite to each other during part of the rotation of the control grip from one operating position into an adjacent one, and wherein during the other part of the rotation of the control grip the end of the switching rod engaged with the control grip is laterally deflectable.

14. The electric switch according to claim 12, wherein at least the first end of the switching rod facing the control grip is swivellable about an axis of rotation being spaced from the axis of rotation of the control grip and wherein the switching rod may be taken along by the control grip and be turned about the axis of rotation of the first end.

15. The electric switch according to claim 14, wherein the axis of rotation of the first end of the switching rod and the coupling point between the control grip and the switching rod are positioned opposite to each other relative to a center line of the switching rod.

16. The electric switch according to claim 14, wherein the switching rod opposite to the axis of rotation of the first end has a recess for a locking curve follower and a spring pressing the locking curve follower against a locking curve on the operating lever, and wherein the locking curve follower is guided to the axis of rotation of the end of the switching rod facing the control grip.

17. The electric switch according to claim 1, wherein the control grip is coupled with the switching rod via at least one spring element.

18. The electric switch according to claim 17, wherein the at least one spring element in a first operating position is arranged in a relaxed condition between the control grip and the switching rod and that in a twisting motion of the control grip into a second operating position adjacent to the first operating position at first the switching rod is rotatable via the at least one spring element as far as to a stop and thereafter the spring element may be tensioned more heavily.

19. The electric switch according to claim 18, wherein the control grip and the switching rod have three operating positions and that in the central operating position the sole spring element rests with both ends both on the control grip and one the switching rod.

20. The electric switch according to claim 1, wherein the control grip and the switching rod are coupled with each other via an eccentric piece mounted on the operating lever independently of the control grip and of the switching rod with an axis of rotation spaced from the axis of rotation of the control grip, wherein the spacing between the axis of rotation of the eccentric piece and the point of action of the control grip on the eccentric piece is different than the spacing between the axis of rotation of the control grip and the point of action between the control grip and the eccentric piece and that the spacing between the axis of rotation of the eccentric piece and the point of action between eccentric piece and switching rod is different from the spacing between the axis of rotation of the switching rod and the point of action between the switching rod and the eccentric piece.

21. The electric switch according to claim 20, wherein the two points of action are located opposite each other relative to the axis of rotation of the eccentric piece.

22. The electric switch according to claim 21, wherein in an operating position of the control grip, especially in a central operating position, the two points of action are located in a plane defined by the two axes of rotation of the control grip and of the eccentric piece.

23. The electric switch according to claim 1, wherein in at least one operating position the control grip is locked with a non-rotatable part of the operating lever by means of a locking curve and a locking curve follower.

24. The electric switch according to claim 1, wherein a switching piece movably mounted in the switch housing via the switching rod is adjustable and that in at least one operating position the switching piece is locked with the switch housing by means of a locking curve and of a locking curve follower.

25. The electric switch according to claim 1, wherein the switching rod has a lateral finger on its end not facing the control grip, via which finger the electric contact is movable, wherein in a particular place the finger is guided in a direction including an angle not equal to 90 degrees with the longitudinal direction of the operating lever.

26. The electric switch according to claim 25, wherein the switch rod is displaceable in its longitudinal direction.

27. The electric switch according to claim 25, wherein the finger is guided directly above the outer surface of the switching rod.

28. The electric switch according to claim 25, wherein the finger is guided in a non-rotatable part of the operating lever.

29. The electric switch according to claim 25, wherein the operating lever together with a carrier is mounted in the switch housing to be swivelled about a first axis, wherein the operating lever is swivellably mounted about a second axis preferably vertically intersecting the first axis and that the finger is aligned in the direction of the second axis in at least one operating position of the control grip.

30. An electric switch comprising:
a switch housing;
an operating lever mounted in the housing and swivellable about an axis in the housing;
a control grip rotatable about an axis of rotation extending in the longitudinal direction of the operating lever, the control grip being movable between at least two operating positions for switching an electrical device in each position;
a switching rod substantially aligned in the longitudinal direction of the operating lever and rotatable by rotation of the control grip substantially along the longitudinal axis of the control grip;
at least one electric contact mounted in the switch housing and movable by the switching rod; and
means for turning the switching rod from a first operating position to an adjacent operating position about a partial angle of rotation different from the angle of rotation of a twisting motion of the control grip.

31. The electric switch according to claim 30, wherein the angle of rotation of the switching rod is smaller than the angle of rotation of the control grip.

32. The electric switch according to claim 30, wherein the at least one electric contact is only movable by the switching rod during part of the twisting motion of the control grip between two adjacent operating positions.

33. The electric switch according to claim 32, wherein the movement of the switching rod during a twisting motion of the control grip out of a central operating position in one direction is symmetrical to a movement in a twisting motion of the control grip out of the central operating position into the other direction.

34. The electric switch according to claim 33, wherein in the central operating position of the control grip a center line of the switching rod is co-axial with the axis of rotation of the control grip.

35. The electric switch according to claim 30, wherein the at least one electric contact is movable via the switching rod via the entire twisting motion of the control grip between two adjacent operating positions.

36. The electric switch according to claim 35, wherein the movement of the switching rod during a twisting motion of the control grip out of a central operating position in one direction is symmetrical to a movement in a twisting motion of the control grip out of the central operating position into the other direction.

37. The electric switch according to claim 36, wherein in the central operating position of the control grip a center line of the switching rod is co-axial with the axis of rotation of the control grip.

38. The electric switch according to claim 30, wherein the movement of the switching rod during the twisting motion of the control grip between two operating positions is a pure rotation about an axis of rotation extending in the longitudinal direction of the operating lever.

39. The electric switch according to claim 38, wherein the axis of rotation of the pure rotation of the switching rod coincides with the axis of rotation of the control grip.

40. The electric switch according to claim 30, wherein, during a twisting motion of the control grip between two operating positions, the movement of the switching rod is composed of a rotation about a longitudinal axis and of a lateral deflection of the end of the switching rod facing the control grip about the second end of the switching rod.

41. The electric switch according to claim 40, wherein the second end of the switching rod is mounted in the operating lever to be swivellable to all sides.

42. The electric switch according to claim 41, wherein the second end of the switch rod is provided with a ball-shaped outer surface.

43. The electric switch according to claim 30, wherein the control grip and the switching rod are directly coupled with each other.

44. The electric switch according to claim 43, wherein the switching rod and the operating lever have bearing surfaces for rotation of the switching rod about a longitudinal axis, the bearing surfaces only being opposite to each other during part of the rotation of the control grip from one operating position into an adjacent operating position, and wherein during the other part of the rotation of the control grip, the end of the switching rod engaged with the control grip is laterally deflectable.

45. The electric switch according to claim 43, wherein at least the first end of the switching rod facing the control grip is swivellable about an axis of rotation spaced from the axis of rotation of the control grip and wherein the switching rod may be taken along by the control grip and turned about the axis of rotation of the first end.

46. The electric switch according to claim 45, wherein the axis of rotation of the first end of the switching rod and the coupling point between the control grip and the switching rod are positioned opposite to each other relative to a center line of the switching rod.

47. The electric switch according to claim 45 further comprising:
   a recess formed on the switching rod opposite to the axis of rotation of the first end of the switching rod;
   a locking curve follower disposed in the recess;
   a biasing spring mounted in the recess for pressing the locking curve follower against a locking curve formed on the operating lever; and
   the locking curve follower being guided to the axis of rotation of the end of the switching rod facing the control grip.

48. The electric switch according to claim 30, wherein the control grip is coupled with the switching rod via at least one spring element.

49. The electric switch according to claim 48, wherein the at least one spring element in a first operating position is arranged in a relaxed condition between the control grip and the switching rod and that in a twisting motion of the control grip into a second operating position adjacent to the first operating position at first the switching rod is rotatable via the at least one spring element as far as a stop and thereafter the spring element is tensioned.

50. The electric switch according to claim 49, wherein the control grip and the switching rod have three operating positions including a central operating position, and, in the central operating position, the ends of the at least one spring element resting on the control grip and the switching rod, respectively.

51. The electric switch according to claim 30 further comprising:
   an eccentric piece mounted on the operating lever independently of the control grip and of the switching rod and having an axis of rotation spaced from the axis of rotation of the control grip, the eccentric piece coupling the control grip and the switching rod with each other;
   the spacing between the axis of rotation of the eccentric piece and the point of action between the control grip on the eccentric piece is different than the spacing between the axis of rotation of the control grip and the point of action between the control grip and the eccentric piece; and
   the spacing between the axis of rotation of the eccentric piece and the point of action between the eccentric piece and the switching rod is different from the spacing between the axis of rotation of the switching rod and the point of action between the switching rod and the eccentric piece.

52. The electric switch according to claim 51, wherein the two points of action are located opposite each other relative to the axis of rotation of the eccentric piece.

53. The electric switch according to claim 52, wherein in the central operating position, the two points of action are located in a plane defined by the two axes of rotation of the control grip and the eccentric piece.

54. The electric switch according to claim 30 further comprising:
   a locking curve formed on the operating lever;
   locking curve follower means engaging the locking curve for locking the control grip with a non-rotatable part of the operating lever in at least one operating position of the control grip.

55. The electric switch according to claim 30 further comprising:
   a switching piece movably mounted in the switch housing;
   the switching piece being adjustable by the switching rod such that in at least one operating position the switching piece is locked with the switch housing by means of a locking curve formed on the operating lever and a locking curve follower mounted on the switching rod.

56. The electric switch according to claim 30 further comprising:
   a lateral finger formed on the end of the switching rod not facing the control grip;
   the lateral finger moving the electric contact; and wherein
   in a predetermined position, the lateral finger is guided in a direction including an angle not equal to 90 degrees with the longitudinal direction of the operating lever.

57. The electric switch according to claim 56, wherein the switch rod is displaceable in its longitudinal direction.

58. The electric switch according to claim 56, wherein the finger is guided directly above the outer surface of the switching rod.

59. The electric switch according to claim 56, wherein the finger is guided in a non-rotatable part of the operating lever.

60. The electric switch according to claim 56 further comprising:
   a carrier, the carrier and the operating lever being mounted in the switch housing to be swivelled about a first axis;
   the operating lever being swivellably mounted in the switch housing about a second axis, intersecting the first axis; and
   a lateral finger formed on the end of the switching rod aligned in the direction of the second axis in at least one operating position of the control grip.

* * * * *